US012589828B2

(12) United States Patent
No et al.

(10) Patent No.: US 12,589,828 B2
(45) Date of Patent: Mar. 31, 2026

(54) ELECTRIC MODULE FOR BICYCLE, BICYCLE TIRE MANAGEMENT SYSTEM, AND TIRE CONDITION DIAGNOSIS METHOD OF BICYCLE

(71) Applicant: HL KLEMOVE CORP., Incheon (KR)

(72) Inventors: Eun Jung No, Gyeonggi-do (KR); Bumrae Cho, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 671 days.

(21) Appl. No.: 17/962,454

(22) Filed: Oct. 7, 2022

(65) Prior Publication Data

US 2023/0116010 A1     Apr. 13, 2023

(30) Foreign Application Priority Data

Oct. 13, 2021     (KR) ........................ 10-2021-0136086

(51) Int. Cl.
| | |
|---|---|
| *B62M 6/50* | (2010.01) |
| *B62J 45/412* | (2020.01) |
| *B62J 50/22* | (2020.01) |
| *G07C 5/00* | (2006.01) |
| *G07C 5/08* | (2006.01) |
| *B60C 23/02* | (2006.01) |

(52) U.S. Cl.
CPC .............. *B62M 6/50* (2013.01); *B62J 45/412* (2020.02); *B62J 50/22* (2020.02); *G07C 5/008* (2013.01); *G07C 5/0816* (2013.01); *B60C 23/02* (2013.01)

(58) Field of Classification Search
None
See application file for complete search history.

(56) References Cited

U.S. PATENT DOCUMENTS

2018/0154980 A1* 6/2018 Lee ........................ B60L 50/20

FOREIGN PATENT DOCUMENTS

| | | | | |
|---|---|---|---|---|
| CN | 204489055 U | * | 7/2015 | |
| CN | 107067493 A | * | 8/2017 | ......... G06Q 30/0207 |
| CN | 107867131 | | 4/2018 | |

(Continued)

OTHER PUBLICATIONS

Office Action dated Jun. 14, 2024 for Chinese Patent Application No. 202211254757.4 and its English translation provided by Applicant's foreign counsel.

(Continued)

*Primary Examiner* — Vicky A Johnson
(74) *Attorney, Agent, or Firm* — WOMBLE BOND DICKINSON (US) LLP

(57) ABSTRACT

An electric module for a bicycle according to an example embodiment of the present disclosure is equipped on the bicycle including a pedal configured to generate rotational energy and a driving wheel configured to rotate by receiving power, and the electric module includes a pedal rotation speed detector configured to measure a rotation speed of the pedal, a motor configured to rotate the driving wheel, a driving wheel rotation speed detector configured to measure a rotation speed of the driving wheel, a control device configured to determine whether a tire is abnormal based on the rotation speed of the pedal, a torque of the motor, and the rotation speed of the driving wheel, and a user interface device configured to display condition information of the tire provided by the control device.

18 Claims, 7 Drawing Sheets

(56) References Cited

FOREIGN PATENT DOCUMENTS

| | | |
|---|---|---|
| CN | 108688763 | 10/2018 |
| CN | 208225106 | 12/2018 |
| CN | 109203873 | 1/2019 |
| CN | 112622535 | 4/2021 |
| EP | 3 360 769 | 8/2018 |
| KR | 10-2018-0092129 | 8/2018 |

OTHER PUBLICATIONS

Office Action dated Jan. 15, 2026 for Korean Patent Application No. 10-2021-0136086 and its English translation from Global Dossier.

* cited by examiner

1

ELECTRIC MODULE FOR BICYCLE, BICYCLE TIRE MANAGEMENT SYSTEM, AND TIRE CONDITION DIAGNOSIS METHOD OF BICYCLE

CROSS-REFERENCE TO RELATED APPLICATION

This application claims the benefit of Korean Patent Application No. 10-2021-0136086 filed on Oct. 13, 2021, in the Korean Intellectual Property Office, the entire disclosure of which is incorporated herein by reference for all purposes.

BACKGROUND

1. Field of the Invention

One or more example embodiments relate to an electric module for a bicycle, a tire management system for a bicycle equipped with an electric module for a bicycle, and a tire condition diagnosis method for a bicycle.

2. Description of the Related Art

In general, as one of the means of short-distance transportation, a bicycle has recently been widely used for exercise or hobbies for purposes such as health. Recently, in order to travel a long distance or to reduce physical consumption of a user, a bicycle equipped with an electric module has been popularized so that it may be driven by a driving force of a motor.

As such, a bicycle equipped with an electric module is configured to assist driving with the power of the motor by detecting when the driver turns the pedal by equipping a conventional bicycle that may only be moved by existing manpower with an electric module including a battery and a motor. To this end, the electric module for a bicycle may further include a speed reducer for reducing the rotational force of the motor in addition to the motor and the battery, a power transmission device for transmitting the rotational force output from the speed reducer to the wheels, and a control device for controlling them.

In addition, in the electric module for a bicycle, the user may operate and control the rotational force of the motor through the control device, but may further include a speed sensor installed to sense the rotation speed of the pedal to control the motor operation more precisely by sensing the user's pedal force when driving on a slope such as uphill or downhill, or a torque sensor installed in the motor.

In addition, the electric module for a bicycle may be divided into a pedal assist system (PAS) type and a throttle type according to the driving type.

In the PAS type, there is a sensor on the pedal, etc., and when the user steps on the pedal, the sensor detects it and then the motor operates. The PAS type is mostly designed to enable step setting from low power support to high power support, and includes a speed sensor type that senses the rotation of the pedal and transmits power, and a torque sensor type that senses the pressure of the pedal, the rotation of the pedal, and the number of revolutions. Although the speed sensor type has a low price, there is a sense of difference in driving feeling. The torque sensor type recognizes the user's pedal torque, so there is relatively little difference as a bicycle.

In the throttle type, the electric module is equipped on a handlebar in the form of a button or lever, and when activated, the bicycle drives like a motorcycle without the need to roll the pedal.

In addition, depending on the type of electric module to be equipped, a bicycle without a chain may appear, and in the bicycle with no chain, the force of a user's pedaling is converted into electricity by a generator connected to the pedal and stored in a battery, and the electricity stored in the battery turns the motor to move the bicycle. A bicycle equipped with this type of electric module may improve the acceleration performance of the bicycle by controlling the motor suitable for the driving environment, implement an automatic shift function by adjusting the gear ratio between the rotation speed of the pedal and the rotation speed of the driving wheel, and amplify the power transmitted by the user to the pedal according to an intuitive ratio.

However, if a tire is damaged or worn, or insufficient in air pressure occurs while riding the bicycle, it may cause a malfunction in control of the electric module. In other words, a situation in which the bicycle does not operate normally may occur. In such a situation, an actual torque of the motor does not occur as much as a speed command value, which is an input value for controlling the motor, so it is difficult for the bicycle to effectively perform its functions, and it may put a strain on the electric module.

SUMMARY

Example embodiments provide an electric module for a bicycle and a bicycle tire management system capable of diagnosing a condition of a tire.

Further, example embodiments provide a tire condition diagnosis method of a bicycle capable of diagnosing the condition of the tire.

According to an aspect, there is provided an electric module for a bicycle equipped on the bicycle including a pedal configured to generate rotational energy and a driving wheel configured to rotate by receiving power, including a pedal rotation speed detector configured to measure a rotation speed of the pedal, a motor configured to rotate the driving wheel, a driving wheel rotation speed detector configured to measure a rotation speed of the driving wheel, a control device configured to determine whether a tire is abnormal based on the rotation speed of the pedal, a torque of the motor, and the rotation speed of the driving wheel, and a user interface device configured to display condition information of the tire provided by the control device.

The control device may be configured to estimate an air pressure of the tire by analyzing the rotation speed of the driving wheel compared to the torque of the motor according to the rotation speed of the pedal.

The control device may be configured to determine that an abnormality occurs in the tire when the estimated air pressure of the tire is out of a preset allowable pressure.

The control device may be configured to correct the torque of the motor according to a change in the estimated air pressure of the tire.

In addition, the control device may be configured to determine that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

In addition, the control device may be configured to control the user interface to notify the fact that an abnormality occurs in the tire when a preset second reference time elapses in a condition where an abnormality occurs.

According to another aspect, there is provided an electric module for bicycle equipped on a bicycle including a pedal configured to generate rotational energy and a driving wheel configured to rotate by receiving power, including a pedal rotation speed detector configured to measure a rotation speed of the pedal, a motor configured to rotate the driving wheel, a driving wheel rotation speed detector configured to measure a rotation speed of the driving wheel, a control device configured to determine whether a tire is abnormal based on the rotation speed of the pedal, a torque of the motor, and the rotation speed of the driving wheel, and a modem terminal configured to transmit condition information of the tire provided by the control device, a mobile terminal in which an application for managing the bicycle on which the electric module for the bicycle is equipped and displaying the condition information of the tire is installed, and a cloud service configured to receive information transmitted by the modem terminal to update stored information, and transmit the updated information to the mobile terminal.

The cloud service may include a web application server configured to communicate with the modem terminal, a database server configured to integrate and store information collected by the web application server, and an application programming interface gateway for transmitting information stored in the database server to the mobile terminal.

The control device may be configured to estimate an air pressure of the tire by analyzing the rotation speed of the driving wheel compared to the torque of the motor according to the rotation speed of the pedal.

The control device may be configured to determine that an abnormality occurs in the tire when the estimated air pressure of the tire is out of a preset allowable pressure.

The control device may be configured to correct the torque of the motor according to a change in the estimated air pressure of the tire.

In addition, the control device may be configured to determine that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

The control device may be configured to transmit information indicating that the tire is in an abnormal condition to the cloud service through the modem terminal when a preset second reference time elapses in a condition where an abnormality occurs in the tire.

The bicycle may further include a user interface device configured to display condition information of the tire provided by the control device.

According to another aspect, there is provided a tire condition diagnosis method of a bicycle, including measuring a rotation speed of a pedal, measuring a rotation speed of a driving wheel, measuring a torque of a motor rotating the driving wheel, determining whether a tire is abnormal based on the rotation speed of the pedal, the rotation speed of the driving wheel, and the torque of the motor, and warning a user when an abnormality occurs in the tire.

The method may include estimating an air pressure of the tire by analyzing the rotation speed of the driving wheel compared to the torque of the motor according to the rotation speed of the pedal, and determining that an abnormality has occurred in the tire when the air pressure of the tire estimated is out of a preset allowable pressure.

In addition, the determining of whether the tire is abnormal may include determining that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

The warning the user may include warning the user of a fact that an abnormality occurs in the tire when a preset second reference time elapses after it is determined that an abnormality occurs in the tire.

The warning the user may include transmitting information indicating that the tire is in an abnormal condition to a cloud service, and transmitting condition information of the tire received by the cloud service to a mobile terminal.

According to an electric module for a bicycle and a bicycle tire management system of example embodiments, it is possible to effectively diagnose the condition of the tire.

In addition, according to a tire condition diagnosis method of a bicycle of example embodiments, it is possible to effectively diagnose the condition of the tire.

DETAILED DESCRIPTION

Figure 1:
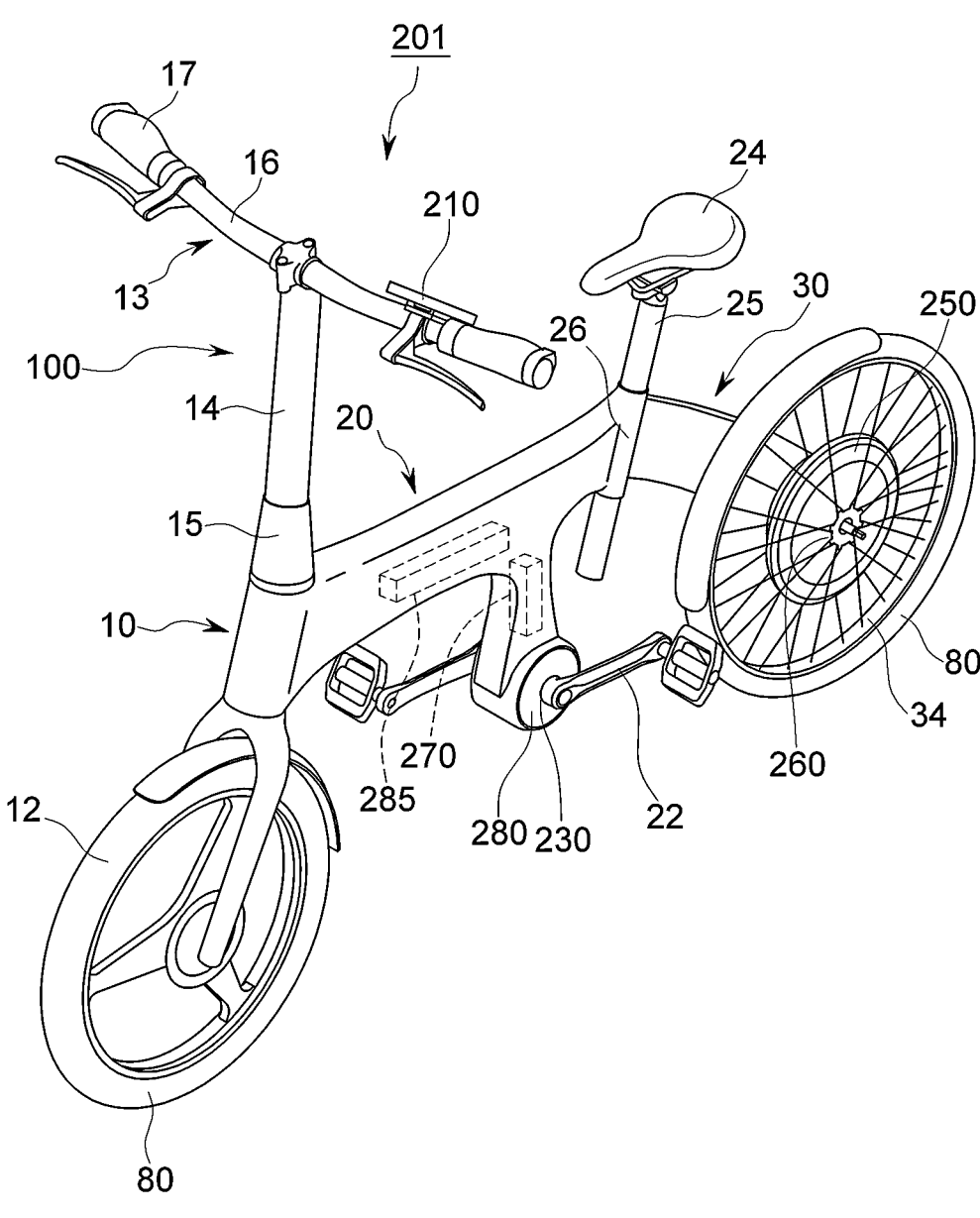
FIG. 1 is a perspective view of a bicycle equipped with an electric module for a bicycle according to a first example embodiment of the present disclosure.

Hereinafter, with reference to the accompanying drawings, example embodiments of the present disclosure will be described in detail so that those of ordinary skill in the art to which the present disclosure pertains may easily implement them. The present disclosure is not limited by example embodiments disclosed below, and may be implemented in various different forms.

In addition, in various example embodiments, components having the same configuration are typically described in a first example embodiment using the same reference numerals, and only configurations different from the first example embodiment will be described in a second example embodiment.

It should be noted that the drawings are schematic and not drawn to scale. Relative dimensions and proportions of parts in the drawings are shown exaggerated or reduced in size for clarity and convenience in the drawings, and any dimensions are illustrative only and not limiting. Further, the same reference numerals are used to denote like features for the same structure, element, or part appearing in two or more drawings.

The example embodiments of the present disclosure specifically represent ideal embodiments of the present disclosure. As a result, various modifications of the diagrams are expected. Accordingly, the example embodiments are not limited to specific shapes of the illustrated area, and include, for example, a shape modification by manufacturing.

Hereinafter, an electric module 201 for a bicycle according to the first example embodiment of the present disclosure will be described with reference to FIGS. 1 and 2.

Figure 2:
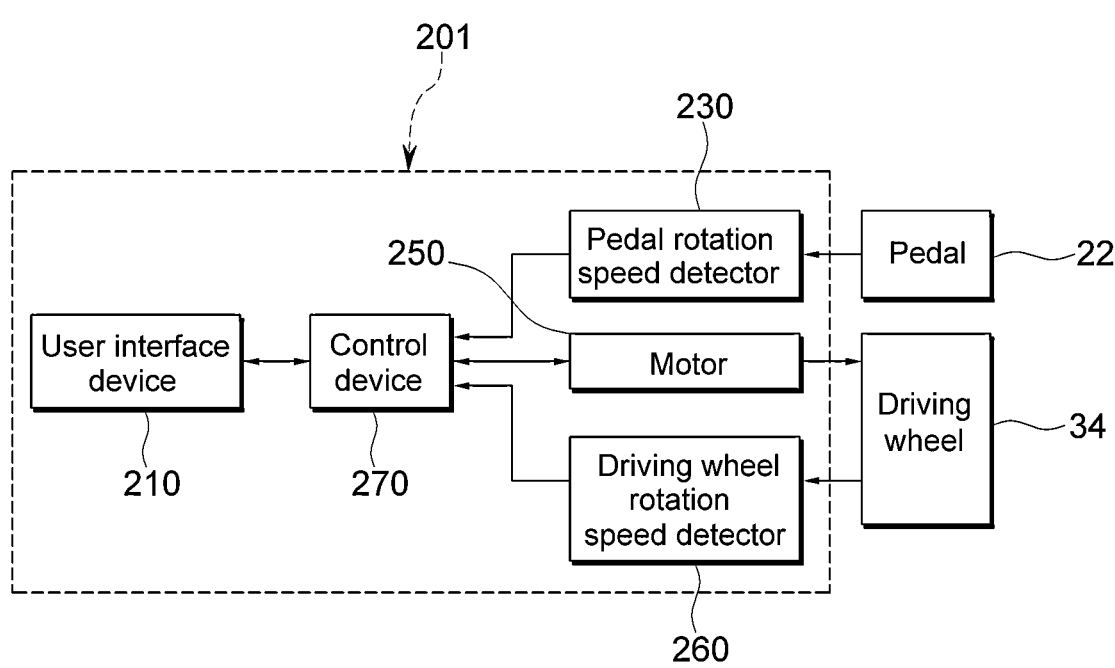
FIG. 2 is a configuration diagram illustrating a system for diagnosing a condition of a tire by the electric module for a bicycle of FIG. 1.

FIG. 1 exemplarily shows a bicycle 100 to which the electric module 201 for a bicycle according to the first example embodiment of the present disclosure is applied. FIG. 1 illustrates the bicycle 100 without a chain as an example, but the present disclosure is not limited thereto, and those skilled in the art may apply the electric module 201 for a bicycle according to the first example embodiment of the present disclosure to other bicycles driven by a chain through appropriate modifications and variations.

As shown in FIG. 1, the bicycle 100 to which the electric module 201 for a bicycle is applied may include a front frame 10, a middle frame 20, and a rear frame 30.

The front frame 10 may include a front wheel 12 and a handle stay 14 to which a handle unit 13 is connected.

The handle unit 13 may include a handle stem 15 coupled to the lower end of the handle stay 14, a handle bar 16 coupled to the handle stay 14, and a handle grip 17 installed on the handle bar 16.

The handle stem 15 may be provided to adjust the height of the handle unit 13, and the handle bar 16 may be provided to determine the steering of the bicycle.

In addition, the handle grip 17 is provided with a user interface device 210 that displays the condition of the electric module 201 for a bicycle equipped on the bicycle 100 to be described later to a user and transmits the user's request to the control device 270 through a button or a display. The user interface device 210 may be electrically connected to the control device 270 through a wired or wireless connection. In addition, the information displayed by the user interface device 210 may include condition information of the tire 80.

A generator 280 is provided at one end of the middle frame 20, and pedals 22 may be rotatably installed on both sides of the generator 280. When the user rotates the pedal 22, i.e., when the pedal 22 generates rotational energy, the rotational energy of the pedal 22 is converted into electrical energy by the generator 280, and the electrical energy of the generator 280 may be stored in the battery 285 provided in the middle frame 20.

In addition, the middle frame 20 may further include a saddle tube 25 for installing the saddle 24. The saddle tube 25 is height-adjustably coupled to the seat tube 26 protruding from the rear of the middle frame 20.

A rear wheel 34 is rotatably installed to an end of the rear frame 30. A motor 250 for advancing the bicycle 100 by rotationally driving the rear wheel 34 is equipped at the center of the rear wheel 34. In other words, the rear wheel 34 becomes the driving wheel. However, the rear wheel 34 is not necessarily the driving wheel, and when the motor is equipped on the front wheel 12, the front wheel 12 may be the driving wheel. As such, among the front wheel 12 and the rear wheel 34, a wheel rotating by receiving power may be a driving wheel. Hereinafter, in the present specification, the rear wheel 34 is referred to as a driving wheel.

Further, the front wheel 12 and the rear wheel, which is the driving wheel 34, each include a tire 80.

Meanwhile, the positions of the battery 285 and the control device 270 are not limited thereto, and may be built in the rear frame 30 instead of the middle frame 20.

The electric module 201 for a bicycle according to the first example embodiment of the present disclosure includes the aforementioned control device 270, user interface device 210, generator 280, and battery 285. In addition, the electric module 201 for a bicycle further includes a pedal rotation speed detector 230, a motor 250, and a driving wheel rotation speed detector 260. The electric module 201 for a bicycle is equipped on the bicycle 100 to drive the bicycle with electric energy.

The pedal rotation speed detector 230 may measure the rotation speed of the pedal. For example, the pedal rotation speed detector 230 may be installed on the rotation shaft of the pedal 22.

The driving wheel rotation speed detector 260 may measure the rotation speed of the driving wheel 34. For example, the driving wheel rotation speed detector 260 may be installed on the rotation shaft of the driving wheel 34.

In addition, in the first example embodiment of the present disclosure, the torque of the motor 250 may be measured by a torque sensor equipped on the motor 250 or indirectly calculated by measuring a current applied to the motor 250.

The control device 270 may determine whether the tire 80 is abnormal based on the rotation speed of the pedal 22, the torque of the motor 250, and the rotation speed of the driving wheel 34.

Specifically, the control device 270 may estimate the air pressure of the tire 80 by analyzing the rotation speed of the driving wheel 34 compared to the torque of the motor 250 according to the rotation speed of the pedal 22. In addition, when the estimated air pressure of the tire 80 is out of a preset allowable pressure, the control device 270 may determine that an abnormality occurs in the tire 80.

In addition, when the control device 270 detects an abnormality in the tire 80 of the bicycle 100 and the torque transmission efficiency of the motor 250 decreases, it is possible to control the system of the electric module 201 for a bicycle so that an overcurrent does not flow.

In addition, the control device 270 may detect that the tire 80 of the bicycle 100 is completely spread to prevent a malfunction and notify the user that a normal operation is impossible any more.

The user interface device 210 may display the tire 80 condition information provided by the control device 270 as described above. For example, the user interface device 210 may generate a signal in various forms to display a warning to the user through a display or to allow the user to recognize that the air pressure of the tire 80 is out of an allowable range.

With such a configuration, the electric module 201 for a bicycle according to the first example embodiment of the present disclosure may basically drive the bicycle 100 and effectively diagnose the condition of the tire 80.

In particular, the condition of the tire 80 of the bicycle 100 may be effectively diagnosed without a separate pressure sensor for measuring the pressure of the tire 80. And, by warning the user of this, the user may take appropriate action to ensure safety.

Specifically, when the air pressure of the tire 80 of the bicycle 100 is lowered, the wear of the tire 80 increases and the ground resistance increases, so that a greater torque is required for driving. In addition, since insufficient air pressure of the tire 80 leads to a loss of power of the electric module 201 for a bicycle as well as damage to the tube, a great risk may occur to a driver while driving. Therefore, it is important to detect the condition of the tire 80 of the bicycle 100 to cope with the failure.

Accordingly, in the first example embodiment of the present disclosure, before the tire 80 of the bicycle 100 is damaged, the user is reminded of the danger caused by the decrease in air pressure and a dangerous accident may be prevented by inducing a failure diagnosis in advance.

Figure 3:
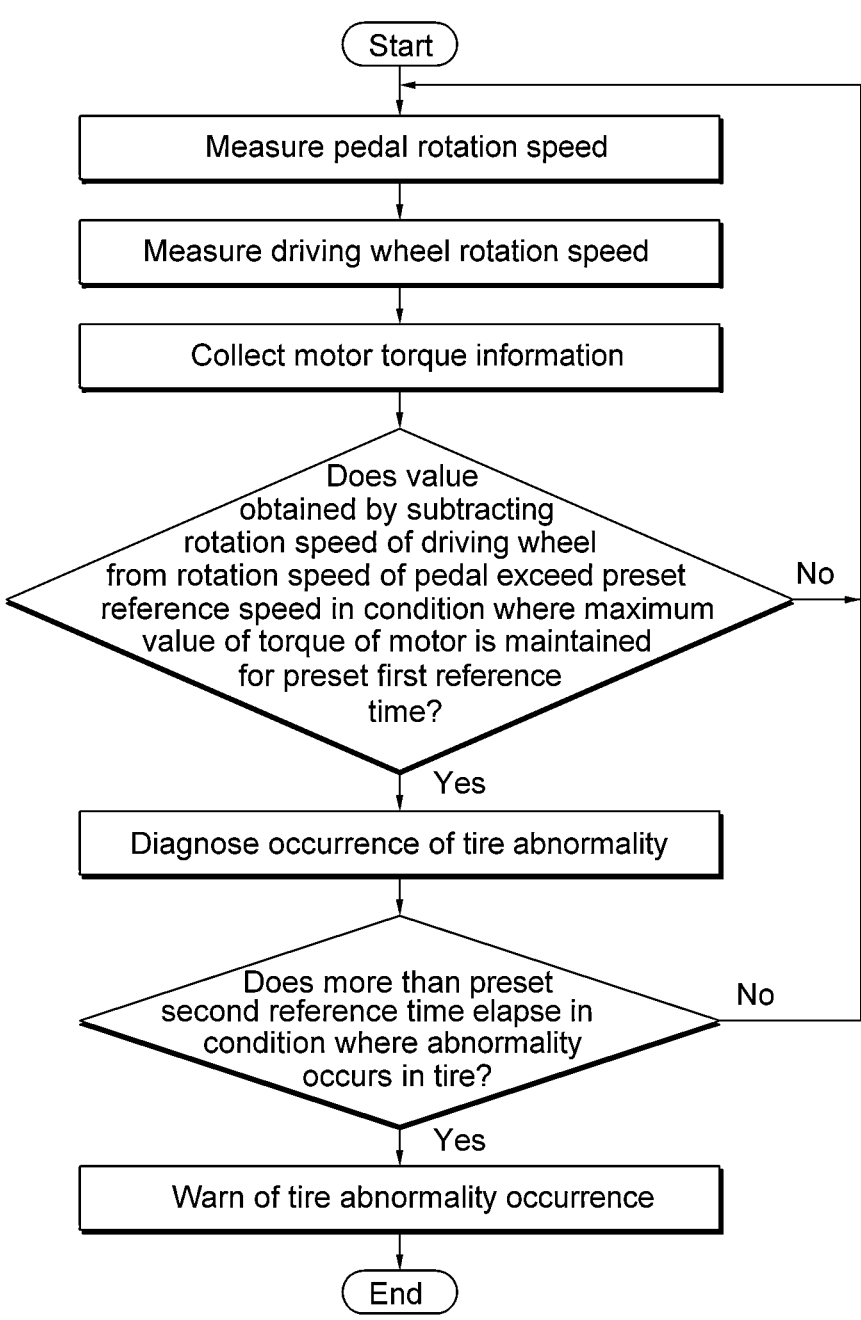
FIG. 3 is a flowchart illustrating a method of diagnosing the tire of the bicycle using the electric module for a bicycle according to the first example embodiment of the present disclosure.
Figure 4:
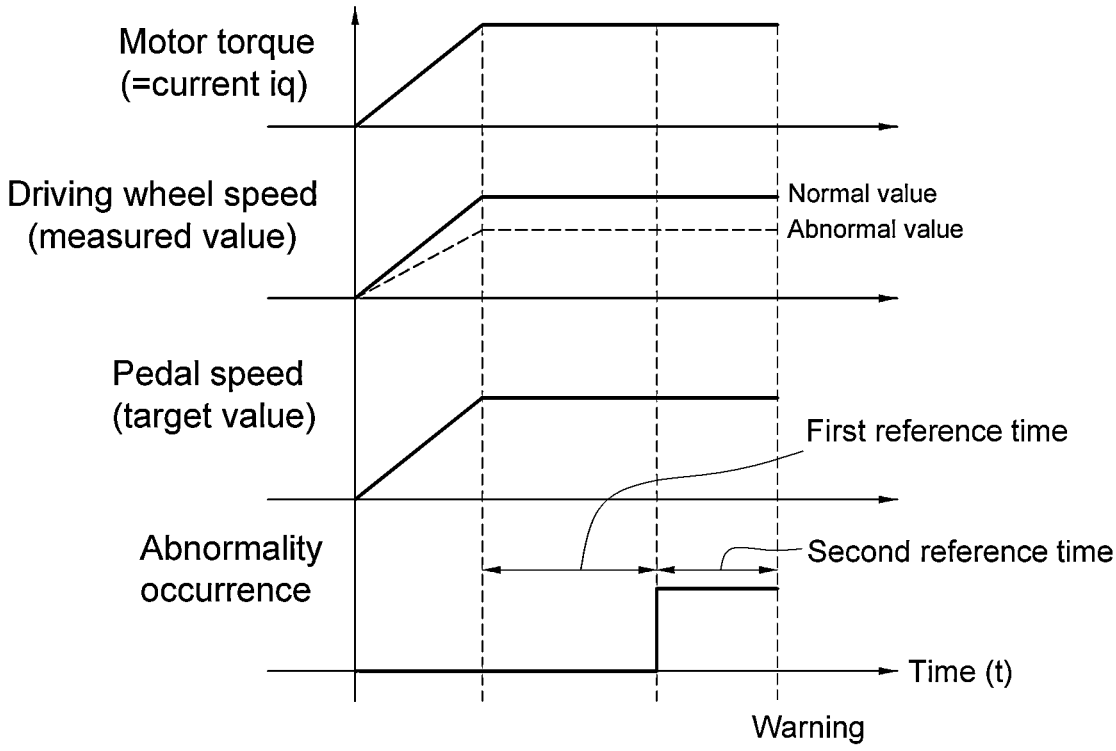
FIG. 4 is a graph for explaining a method of diagnosing the tire of the bicycle in FIG. 3.

Hereinafter, a tire 80 condition diagnosis method of the bicycle 100 equipped with the electric module 201 for a bicycle according to the first example embodiment of the present disclosure will be described in detail with reference to FIGS. 3 and 4.

First, the rotation speed of the pedal 22, the rotation speed of the driving wheel 34, and the torque of the motor 250 may be measured. Here, the torque of the motor 250 may be measured using a torque sensor or calculated using an applied current.

Next, it may be determined whether the tire 80 is abnormal based on the rotation speed of the pedal 22, the rotation speed of the driving wheel 34, and the torque of the motor 250. This determination is made by the control device 270.

Specifically, in the operation of determining whether the tire 80 is abnormal, when the value obtained by subtracting the rotation speed of the driving wheel 34 from the rotation speed of the pedal 22 exceeds the preset reference speed in a state where the maximum value of the torque of the motor 250 is maintained for a preset first reference time, it is determined that an abnormality occurs in the tire 80. Here, the abnormality occurrence of the tire 80 may simply be a lack of air pressure in the tire 80, or the tire 80 may be worn or damaged. Here, the first reference time and the reference speed may be determined according to the specifications and performance of the tire 80 and the motor 250 equipped on the bicycle 100.

Next, if it is determined that an abnormality occurs in the tire 80, a warning may be given to the user. Such a warning to the user may be performed by the user interface device 210 under the control of the control device 270.

Specifically, in the operation of warning the user, when it is determined that an abnormality has occurred in the tire 80 and a preset second reference time elapses, the user may be warned of the fact that an abnormality has occurred in the tire 80. Here, the second reference time may be determined according to the specifications and performance of the tire 80 and the motor 250 equipped on the bicycle 100.

As such, the reason for setting a delay time before warning the user after determining the fact that the abnormality of the tire 80 has occurred is to filter out noise caused by a measurement error, since a temporary error may occur in the rotation speed of the pedal 22, the rotation speed of the driving wheel 34, and the torque of the motor 250 measured according to the driving situation of the bicycle 100. Accordingly, it is possible to prevent frequent warning of the user in unnecessary situations.

As described above, the tire condition diagnosis method of the bicycle 100 estimates the air pressure of the tire 80 by analyzing the rotation speed of the driving wheel 34 compared to the torque of the motor 250 according to the rotation speed of the pedal 22, and, by determining that an abnormality occurs in the tire 80 when the estimated air pressure of the tire 80 is out of the preset allowable pressure, it is possible to effectively diagnose the condition of the tire 80 of the bicycle 100.

As a result of diagnosing the condition of the tire 80, when the air pressure of the tire 80 is normal, the driving wheel 34 rotates at a constant speed according to the torque of the motor 250, but when the air pressure of the tire 80 is lowered, in proportion to the insufficient air pressure of the tire 80, the rotation speed of the driving wheel compared to the torque of the motor 250 is not normally maintained. Further, when the driving wheel rotation speed is lowered, an error value increases as a difference occurs with the pedal rotation speed, and as the current value applied to the motor 250 increases to reduce the error value, the system load of the electric module 201 for a bicycle is increased.

However, through the electric module 201 for a bicycle and the tire condition diagnosis method of the bicycle 100 using the same according to the first example embodiment of the present disclosure, even without a separate pressure sensor for measuring the pressure of the tire 80, the user may diagnose the condition of the tire 80 and respond appropriately.

In addition, the electric module 201 for a bicycle according to the first example embodiment of the present disclosure not only diagnoses the condition of the tire 80 and warns the user, but also corrects the torque of the motor 250 according to the air pressure of the tire 80 to reduce the feeling of discomfort to the user.

Figure 5:
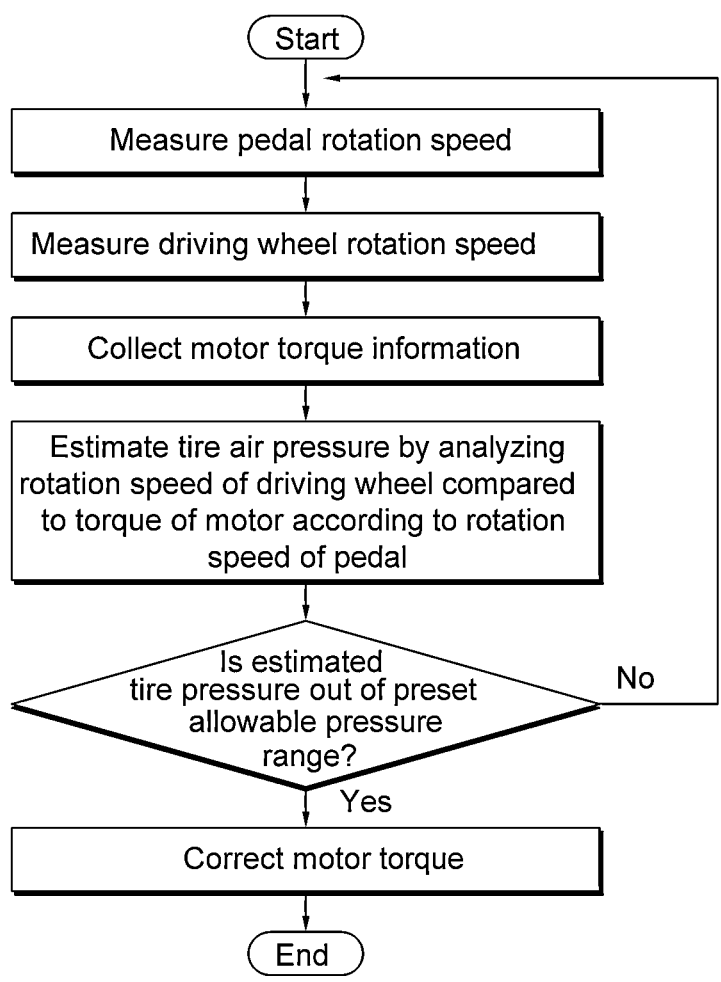
FIG. 5 is a flowchart illustrating a method of controlling a motor according to the condition of the tire of the bicycle using the electric module for a bicycle according to the first example embodiment of the present disclosure.

Specifically, as shown in FIG. 5, the control device 270 may measure the rotation speed of the pedal 22, the rotation speed of the driving wheel 34, and the torque of the motor 250, and estimate the air pressure of the tire 80 based on the rotation speed of the pedal 22, the rotation speed of the driving wheel 34, and the torque of the motor 250. In addition, the control device 270 may correct the torque of the motor 250 according to the estimated change in the air pressure of the tire 80. In other words, when the estimated air pressure of the tire 80 is out of a preset allowable range, the torque of the motor 250 may be corrected. Here, the preset allowable range may be determined according to the specifications and performance of the tire 80.

As described above, by correcting the torque of the motor 250 according to the change in the air pressure of the tire 80, a power assistor system (PAS) control technique may be implemented in which the motor 250 provides an appropriate torque according to the current air pressure of the tire 80 to reduce a sense of difference in driving to the user.

Hereinafter, a bicycle tire management system 102 according to the second example embodiment of the present disclosure will be described with reference to FIG. 6.

Figure 6:
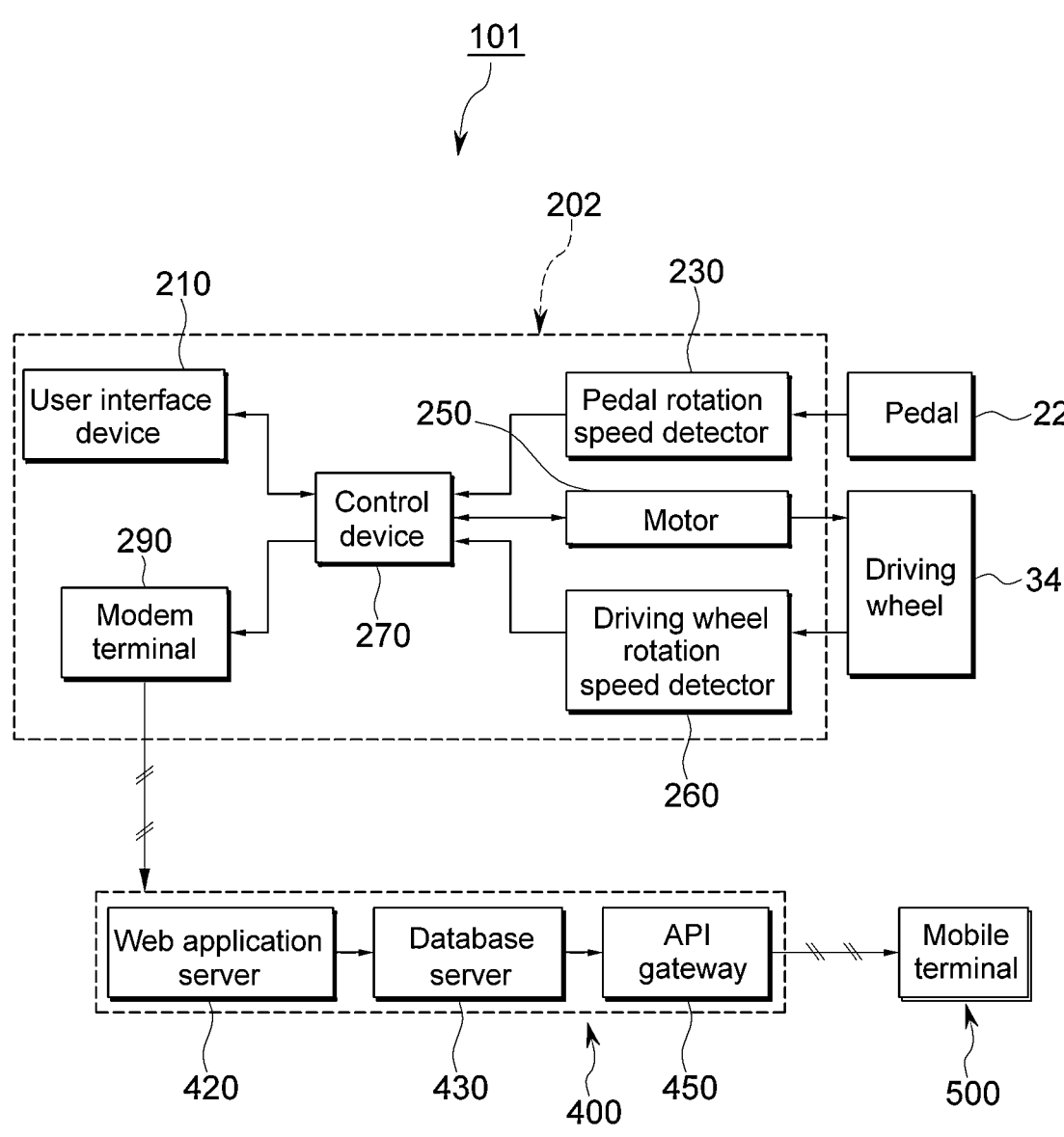
FIG. 6 is a block diagram illustrating a bicycle tire diagnosis system according to a second example embodiment of the present disclosure.

As shown in FIG. 6, the bicycle tire management system 101 according to the second example embodiment of the present disclosure may include an electric module 202 for a bicycle, a cloud service 400, and a mobile terminal 500.

The electric module 202 for a bicycle used in the bicycle tire management system 101 according to the second example embodiment of the present disclosure may be equipped on the bicycle 100 like the electric module 201 of the first example embodiment described above to drive the bicycle 100 by electrical energy. Here, the bicycle 100 may include a pedal 22 that generates rotational energy, and a driving wheel 34 that rotates by receiving power.

The electric module 202 for a bicycle includes a pedal rotation speed detector 230 for measuring the rotation speed of the pedal 22, a motor 250 for rotating the driving wheel 34, and a driving wheel rotation speed detector 260 for measuring the rotation speed of the driving wheel 34, a control device 270 that determines whether or not the tire 80 (shown in FIG. 1) is abnormal based on the rotation speed of the pedal 22, the torque of the motor 250, and the rotation speed of the driving wheel 34, and a modem terminal 290 for transmitting the condition information of the tire 80 provided by the control device 270.

The electric module 202 for a bicycle may further include the user interface device 210.

In the mobile terminal 500, an application for managing the bicycle 100 and the electric module 202 for the bicycle and displaying the condition information of the tire 80 may be installed. In other words, even when the user is not using the bicycle 100, the condition information of the tire 80 of the bicycle 100 may be checked through the mobile terminal 500.

The cloud service 400 may receive information transmitted by the modem terminal 290 of the electric module 202 for a bicycle to update the stored information, and transmit the updated information to the mobile terminal 500.

Specifically, the cloud service 400 may include a web application server 420 that communicates with the modem terminal 290 of the electric module 202 for a bicycle, a database server 430 that integrates and stores the information collected by the web application server 420, and an application programming interface (API) gateway 450 for transmitting information stored in the database server 430 to the mobile terminal 500.

In the second example embodiment of the present disclosure, the control device 270 of the electric module 202 for a bicycle may estimate the air pressure of the tire 80 by analyzing the rotation speed of the driving wheel 34 compared to the torque of the motor 250 according to the rotation speed of the pedal 22. In addition, when the estimated air pressure of the tire 80 is out of a preset allowable pressure, the control device 270 may determine that an abnormality occurs in the tire 80. In addition, the control device 270 may correct the torque of the motor 250 according to the estimated change in the air pressure of the tire 80.

Specifically, when the value obtained by subtracting the rotation speed of the driving wheel 34 from the rotation speed of the pedal 22 exceeds the preset reference speed in a condition where the maximum value of the torque of the motor 250 is maintained for the preset first reference time, the control device 270 of the electric module 202 for a bicycle may determine that an abnormality occurs in the tire 80. In addition, when a preset second reference time elapses in a condition where an abnormality occurs in the tire 80, the control device 270 may transmit information indicating that the tire 80 is in an abnormal condition to the cloud service 400 through the modem terminal 290. In addition, the cloud service 400 transmits the condition information of the tire 80 to the mobile terminal 500 to notify or warn the user of the information.

In addition, in the second example embodiment of the present disclosure, the user interface device 210 of the electric module 202 for a bicycle may display the condition information of the tire 80 provided by the control device 270.

With such configuration, the bicycle tire management system 101 according to the second example embodiment of the present disclosure may effectively diagnose the condition of the tire 80. In addition, by warning the user when an abnormality occurs in the tire 80, the user may take appropriate action to ensure safety.

In particular, according to the second example embodiment of the present disclosure, the user may not only check the condition of the tire through the user interface device 210 while riding on the bicycle 100, but also remotely check the condition of the tire 80 through the mobile terminal 500 even in a state far away from the bicycle 100.

Figure 7:
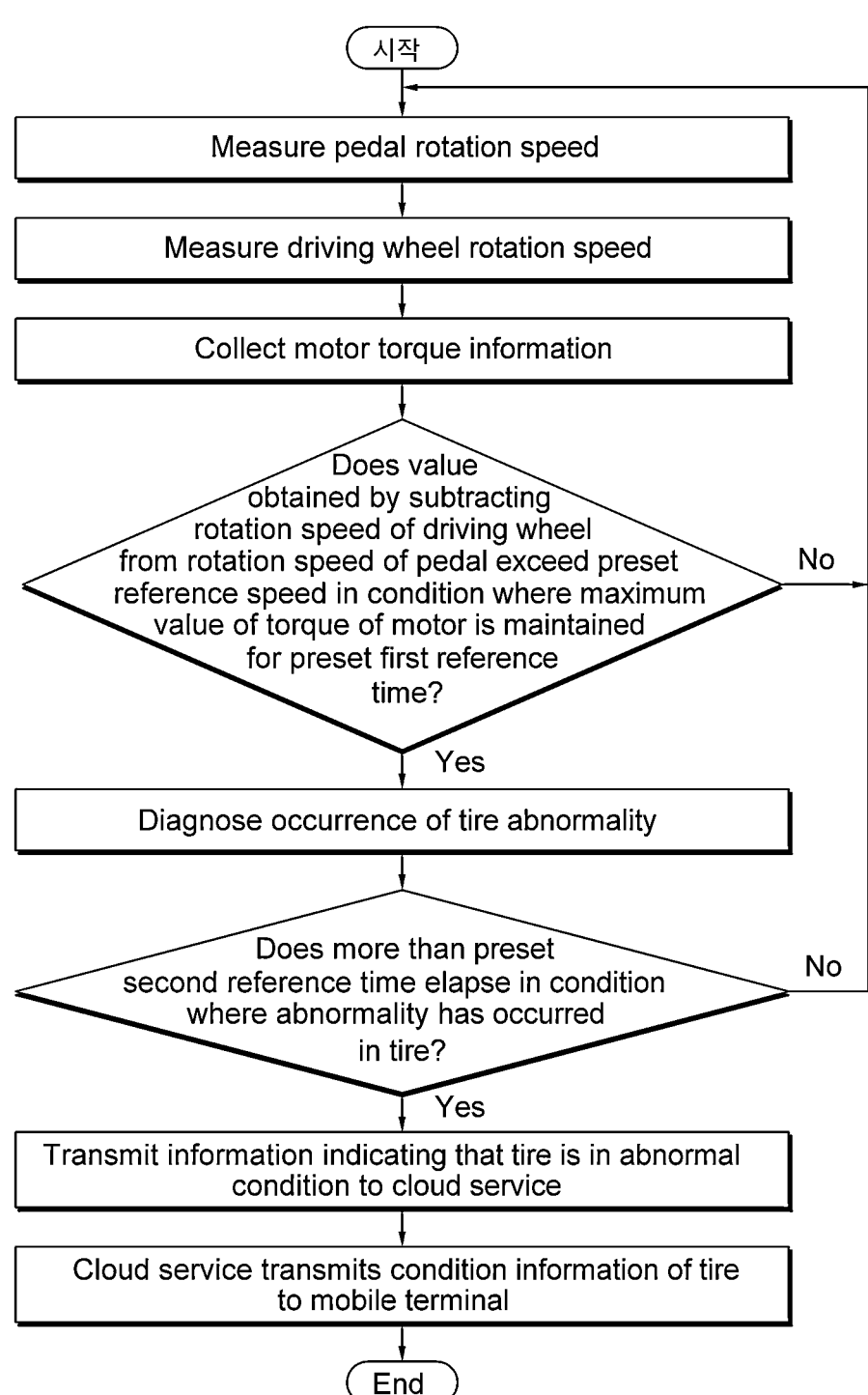
FIG. 7 is a flowchart illustrating a method of diagnosing a tire of a bicycle using the bicycle tire diagnosis system according to the second example embodiment of the present disclosure.

Hereinafter, a condition diagnosis method for the tire 80 of the bicycle 100 using the bicycle tire management system 101 according to the second example embodiment of the present disclosure will be described in detail with reference to FIG. 7.

First, the rotation speed of the pedal 22, the rotation speed of the driving wheel 34, and the torque of the motor 250 may be measured. Here, the torque of the motor 250 may be measured using a torque sensor or calculated using an applied current.

Next, it may be determined whether the tire 80 is abnormal based on the rotation speed of the pedal 22, the rotation speed of the driving wheel 34, and the torque of the motor 250. This determination is made by the control device 270.

Specifically, in the operation of determining whether the tire 80 is abnormal, when the value obtained by subtracting the rotation speed of the driving wheel 34 from the rotation speed of the pedal 22 exceeds the preset reference speed in a condition where the maximum value of the torque of the motor 250 is maintained for a preset first reference time, it is determined that an abnormality occurs in the tire 80. Here, the abnormality occurrence of the tire 80 may simply be a lack of air pressure in the tire 80, or the tire 80 may be worn or damaged. Here, the first reference time and the reference speed may be determined according to the specifications and performance of the tire 80 and the motor 250 equipped on the bicycle 100.

Next, if it is determined that an abnormality occurs in the tire 80, a warning may be given to the user. Such a warning to the user may be performed by the user interface device 210 under the control of the control device 270.

Specifically, in the operation of warning the user, when it is determined that an abnormality has occurred in the tire 80 and a preset second reference time elapses, the user may be warned of the fact that an abnormality has occurred in the tire 80. Here, the second reference time may be determined according to the specifications and performance of the tire 80 and the motor 250 equipped on the bicycle 100.

As such, the reason for setting a delay time before warning the user after determining the fact that the abnormality of the tire 80 occurs is to filter out noise caused by a measurement error, because a temporary error may occur in the rotation speed of the pedal 22, the rotation speed of the driving wheel 34, and the torque of the motor 250 measured according to the driving situation of the bicycle 100. Accordingly, it is possible to prevent frequent warning of the user in unnecessary situations.

As described above, the tire condition diagnosis method of the bicycle 100 may estimate the air pressure of the tire 80 by analyzing the rotation speed of the driving wheel 34 compared to the torque of the motor 250 according to the rotation speed of the pedal 22, and, by determining that an abnormality occurs in the tire 80 when the estimated air pressure of the tire 80 is out of the preset allowable pressure, it is possible to effectively diagnose the condition of the tire 80 of the bicycle 100.

In addition, in the second example embodiment of the present disclosure, the operation of warning the user may include an operation of transmitting information indicating that the tire 80 is in an abnormal condition to the cloud service 400, and an operation of transmitting the received condition information of the tire 80 by the cloud service 400 to the mobile terminal 500.

Accordingly, the user may remotely check the condition of the tire 80 through the mobile terminal 500 even in a state far away from the bicycle 100.

While example embodiments of the present specification have been described with reference to the accompanying drawings, it is apparent to those skilled in the art that the present disclosure may be embodied in other specific forms without modifying the technical idea or essential characteristics of the present disclosure.

Accordingly, the above described example embodiments should not be construed as restrictive in all respects but as illustrative. The scope of the present specification is indicated by the appended claims rather than the above detailed description, and all changes or modifications derived from the meaning and scope of the claims and their equivalents should be construed as being included in the scope of the present specification.

| [Explanation of Reference Numerals] | |
| --- | --- |
| 10: Front frame | 20: Middle frame |
| 30: Rear frame | 12: Front wheel |
| 14: Handle stay | 16: Handle bar |
| 17: Handle grip | 22: Pedal |
| 24: Saddle | 25: Saddle tube |
| 26: Seat tube | 34: Rear wheel, Driving wheel |
| 80: Tire | |
| 100: Bicycle | |
| 101: Bicycle tire management system | |
| 201, 202: Electric module for bicycle | |
| 210: User interface device | |
| 230: Pedal rotation speed detector | |
| 250: Motor | |
| 260: Driving wheel rotation speed detector | |
| 270: Control device | |
| 280: Generator | |
| 285: Battery | |
| 290: Modem terminal | |
| 400: Cloud service | |
| 420 Web application server | |
| 430: Database server | |
| 450: Application programming interface gateway | |
| 500: Mobile terminal | |

What is claimed is:

1. An electric module for a bicycle equipped on the bicycle comprising a pedal configured to generate rotational energy and a driving wheel configured to rotate by receiving power, the electric module comprising:

a pedal rotation speed detector configured to measure a rotation speed of the pedal;

a motor configured to rotate the driving wheel;

a driving wheel rotation speed detector configured to measure a rotation speed of the driving wheel;

a control device configured to determine whether a tire is abnormal based on the rotation speed of the pedal, a torque of the motor, and the rotation speed of the driving wheel; and a user interface device configured to display condition information of the tire provided by the control device.

2. The electric module of claim 1, wherein the control device is configured to estimate an air pressure of the tire by analyzing the rotation speed of the driving wheel compared to the torque of the motor according to the rotation speed of the pedal.

3. The electric module of claim 2, wherein the control device is configured to determine that an abnormality occurs in the tire when the estimated air pressure of the tire is out of a preset allowable pressure.

4. The electric module of claim 2, wherein the control device is configured to correct the torque of the motor according to a change in the estimated air pressure of the tire.

5. The electric module of claim 1, wherein the control device is configured to determine that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

6. The electric module of claim 5, wherein the control device is configured to control the user interface to notify the fact that an abnormality occurs in the tire when a preset second reference time elapses in a condition where an abnormality occurs.

7. A bicycle tire management system comprising:

an electric module for a bicycle equipped on the bicycle comprising a pedal configured to generate rotational energy and a driving wheel configured to rotate by receiving power, the electric module comprising a pedal rotation speed detector configured to measure a rotation speed of the pedal, a motor configured to rotate the driving wheel, a driving wheel rotation speed detector configured to measure a rotation speed of the driving wheel, a control device configured to determine whether a tire is abnormal based on the rotation speed of the pedal, a torque of the motor, and the rotation speed of the driving wheel, and a modem terminal configured to transmit condition information of the tire provided by the control device;

a mobile terminal in which an application for managing the bicycle on which the electric module for the bicycle is equipped and displaying the condition information of the tire is installed; and a cloud service configured to receive information transmitted by the modem terminal to update stored information, and transmit the updated information to the mobile terminal.

8. The bicycle tire management system of claim 7, wherein the cloud service comprises:

a web application server configured to communicate with the modem terminal;

a database server configured to integrate and store information collected by the web application server; and an application programming interface gateway for transmitting information stored in the database server to the mobile terminal.

9. The bicycle tire management system of claim 7, wherein the control device is configured to estimate an air pressure of the tire by analyzing the rotation speed of the driving wheel compared to the torque of the motor according to the rotation speed of the pedal.

10. The bicycle tire management system of claim 9, wherein the control device is configured to determine that an abnormality occurs in the tire when the estimated air pressure of the tire is out of a preset allowable pressure.

11. The bicycle tire management system of claim 9, wherein the control device is configured to correct the torque of the motor according to a change in the estimated air pressure of the tire.

12. The bicycle tire management system of claim 7, wherein the control device is configured to determine that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

13. The bicycle tire management system of claim 12, wherein the control device is configured to transmit information indicating that the tire is in an abnormal condition to the cloud service through the modem terminal when a preset second reference time elapses in a condition where an abnormality occurs in the tire.

14. The bicycle tire management system of claim 7, wherein the bicycle further comprises a user interface device configured to display condition information of the tire provided by the control device.

15. A tire condition diagnosis method of a bicycle, comprising:

measuring a rotation speed of a pedal;

measuring a rotation speed of a driving wheel;

measuring a torque of a motor rotating the driving wheel;

determining whether a tire is abnormal based on the rotation speed of the pedal, the rotation speed of the driving wheel, and the torque of the motor;

warning a user when an abnormality occurs in the tire;

estimating an air pressure of the tire by analyzing the rotation speed of the driving wheel compared to the torque of the motor according to the rotation speed of the pedal; and determining that an abnormality occurs in the tire when the air pressure of the tire estimated is out of a preset allowable pressure.

16. A tire condition diagnosis method of a bicycle, comprising:

measuring a rotation speed of a pedal;

measuring a rotation speed of a driving wheel;

measuring a torque of a motor rotating the driving wheel;

determining whether a tire is abnormal based on the rotation speed of the pedal, the rotation speed of the driving wheel, and the torque of the motor; and warning a user when an abnormality occurs in the tire, wherein the determining of whether the tire is abnormal comprises determining that an abnormality occurs in the tire when a value obtained by subtracting the rotation speed of the driving wheel from the rotation speed of the pedal exceeds a preset reference speed in a condition where a maximum value of the torque of the motor is maintained for a preset first reference time.

17. The tire condition diagnosis method of a bicycle of claim 16, wherein the warning the user comprises warning the user of a fact that an abnormality occurs in the tire when a preset second reference time elapses after it is determined that an abnormality occurs in the tire.

18. The tire condition diagnosis method of a bicycle of claim 16, wherein the warning the user comprises:

transmitting information indicating that the tire is in an abnormal condition to a cloud service; and transmitting condition information of the tire received by the cloud service to a mobile terminal.

* * * * *